United States Patent [19]

Nakamura

[11] Patent Number: 4,959,789
[45] Date of Patent: Sep. 25, 1990

[54] FUEL INJECTION CONTROL SYSTEM FOR AN AUTOMOTIVE ENGINE

[75] Inventor: Mitsuo Nakamura, Tokyo, Japan

[73] Assignee: Fuji Jukogyo Kabushiki Kaisha, Tokyo, Japan

[21] Appl. No.: 306,868

[22] Filed: Feb. 2, 1989

[30] Foreign Application Priority Data

Feb. 24, 1988 [JP] Japan .................................. 63-41574

[51] Int. Cl.⁵ ............................................ F02M 51/00
[52] U.S. Cl. ............................... 364/431.05; 123/480; 364/431.03
[58] Field of Search ..................... 364/431.05, 431.03; 123/478, 480, 488, 491–494

[56] References Cited

U.S. PATENT DOCUMENTS

| 4,479,186 | 10/1984 | Takao et al. | 364/431.05 |
| 4,643,152 | 2/1987 | Yamato | 364/431.05 |
| 4,709,334 | 11/1987 | Abe et al. | 364/431.05 |
| 4,729,361 | 3/1988 | Otobe et al. | 364/431.05 |
| 4,753,206 | 6/1988 | Inoue et al. | 123/480 |
| 4,814,997 | 3/1989 | Matsumura et al. | 364/431.05 |

FOREIGN PATENT DOCUMENTS

60-3448 1/1985 Japan .

Primary Examiner—Parshotam S. Lall
Assistant Examiner—Michael Zanelli
Attorney, Agent, or Firm—Martin A. Farber

[57] ABSTRACT

A basic injection quantity is determined by engine speed and pressure in an intake passage of an engine. The pressure is estimated from engine speed and throttle position. A transient state such as acceleration of the engine is detected. When the transient state is detected, the estimated pressure is selected, and the basic injection quantity is determined based on the estimated pressure.

6 Claims, 7 Drawing Sheets

FUEL INJECTION CONTROL SYSTEM FOR AN AUTOMOTIVE ENGINE

BACKGROUND OF THE INVENTION

The present invention relates to a system for controlling the fuel injection in an automotive engine in accordance with engine operating conditions.

In a known fuel injection system, basic fuel injection quantity Tp is calculated in dependency on absolute pressure in an intake passage of the engine and engine speed. A pressure sensor is provided downstream of a throttle valve in the engine for detecting the absolute pressure in the intake passage. The engine speed is detected by a crank angle sensor. In accordance with output signals from these sensors, the basic fuel injection quantity Tp is determined. Actual fuel injection quantity Ti is obtained by correcting the basic fuel injection quantity Tp in accordance with engine operating conditions such as coolant temperature and throttle opening degree.

However, the absolute pressure in the intake passage oscillates because of the pulsation of intake air. Consequently, the basic fuel injection quantity Tp varies in accordance with the pulsation. Thus, the operation of the engine becomes unstable, particularly at low engine speed.

Japanese Patent Application Laid-Open 60-3448 discloses a fuel injection control system. In the system, pressure in the intake passage is sampled at a first timing synchronizing with rotation of a crankshaft of an engine, and further sampled at a second timing having a shorter period than the first timing. The sampled pressures are averaged to obtain a first average pressure and a second average pressure. The first and second mean pressures are selected in accordance with engine operating conditions. In dependency on the engine speed and the selected pressure value, the basic fuel injection quantity Tp is calculated.

Figure 7:
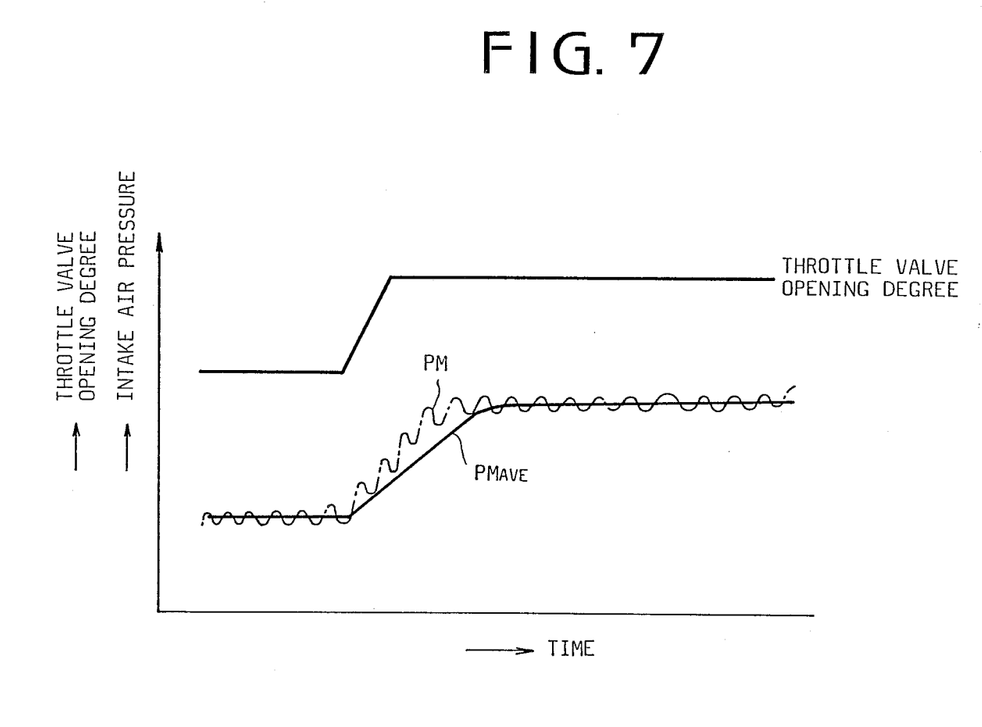
FIG. 7 is a graph showing a relationship between throttle opening degree and intake passage pressure.

However, at a transient state of the operation of the engine, the average pressure $PM_{AVE}$ based on the pressure PM is produced with a delay with respect to the requirement of the engine operation, as shown in FIG. 7. As a result, the fuel injection quantity differs from the necessary quantity.

SUMMARY OF THE INVENTION

The object of the present invention is to provide a fuel injection control system which may provide proper fuel injection quantity without deviation from a necessary quantity.

In the system of the present invention, the pressure in the intake passage is estimated from the engine speed and throttle position. When transient state of engine operation is detected, the estimated pressure is selected, and the basic injection quantity is determined based on the estimated pressure.

According to the present invention, there is provided a system for controlling fuel injection of an engine for a motor vehicle having an intake passage, a throttle valve provided in the intake passage, and a fuel injector for injecting fuel by a quantity determined by the system. The system comprises an engine speed sensor producing an engine speed signal dependent on speed of the engine, a throttle position sensor producing a throttle position signal dependent on the opening degree of the throttle valve, a pressure sensor producing a pressure signal dependent on pressure in the intake passage, first calculator means for averaging pressures represented by the pressure signal and for producing an average pressure signal, estimating means responsive to the engine speed signal and the throttle position signal for estimating pressure in the intake passage and for producing an estimated pressure signal, detector means for detecting engine operating conditions and for producing a steady state signal and a transient state signal in accordance with detected conditions, selector means responsive to the steady state signal for selecting the average pressure signal and responsive to the transient state signal for selecting the estimated pressure signal, and second calculator means responsive to the engine speed signal and the selected pressure signal for producing a basic fuel injection quantity signal for determining the quantity of fuel to be injected.

The other objects and features of this invention will become understood from the following description with reference to the accompanying drawings.

DETAILED DESCRIPTION OF THE PREFERRED EMBODIMENTS

Figure 1:
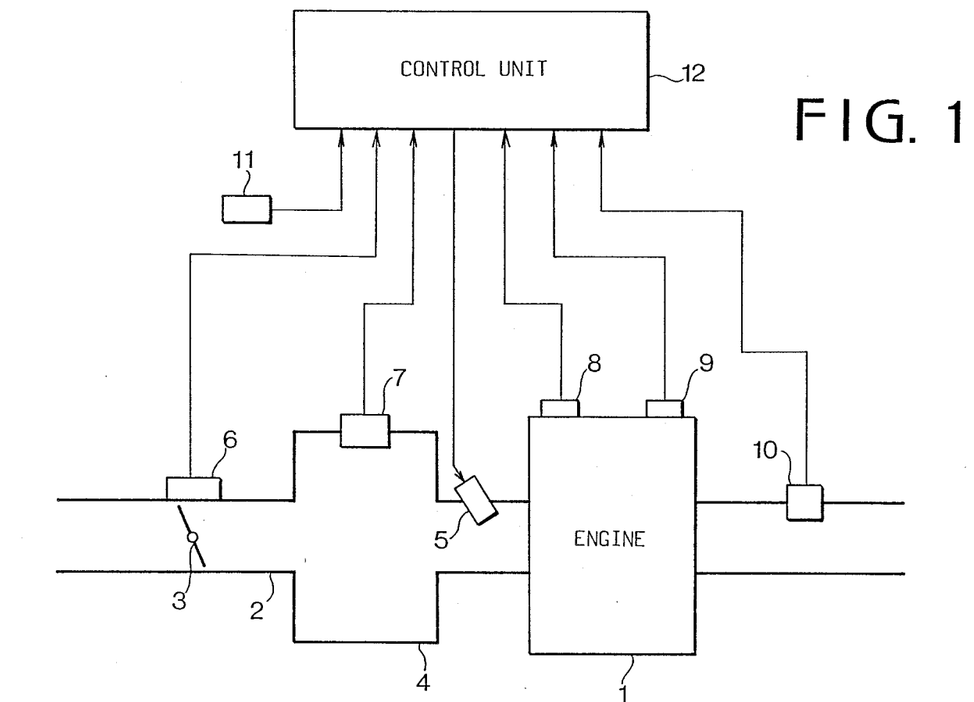
FIG. 1 is a schematic diagram showing a system according to the present invention.

Referring to FIG. 1, in an intake passage 2 of an engine 1, a throttle chamber 4 is provided downstream of a throttle valve 3 so as to absorb the pulsation of intake air. Multiple fuel injectors 5 are provided in the intake passage 2 at positions adjacent engine intake valves so as to supply fuel to each cylinder of the engine 1. A throttle position sensor 6 is provided on the throttle valve 3. A pressure sensor 7 is provided in the throttle chamber 4 for detecting the pressure in the intake passage. A crank angle sensor 8 and a coolant temperature sensor 9 are provided on the engine 1, and an $O_2$-sensor 10 is provided in an exhaust passage from the engine. An atmospheric pressure sensor 11 is provided for detecting atmospheric pressure. Output signals of the sensors for detecting the respective conditions are applied to a control unit 12 comprising a microcomputer to operate the fuel injectors 5.

Figure 2:
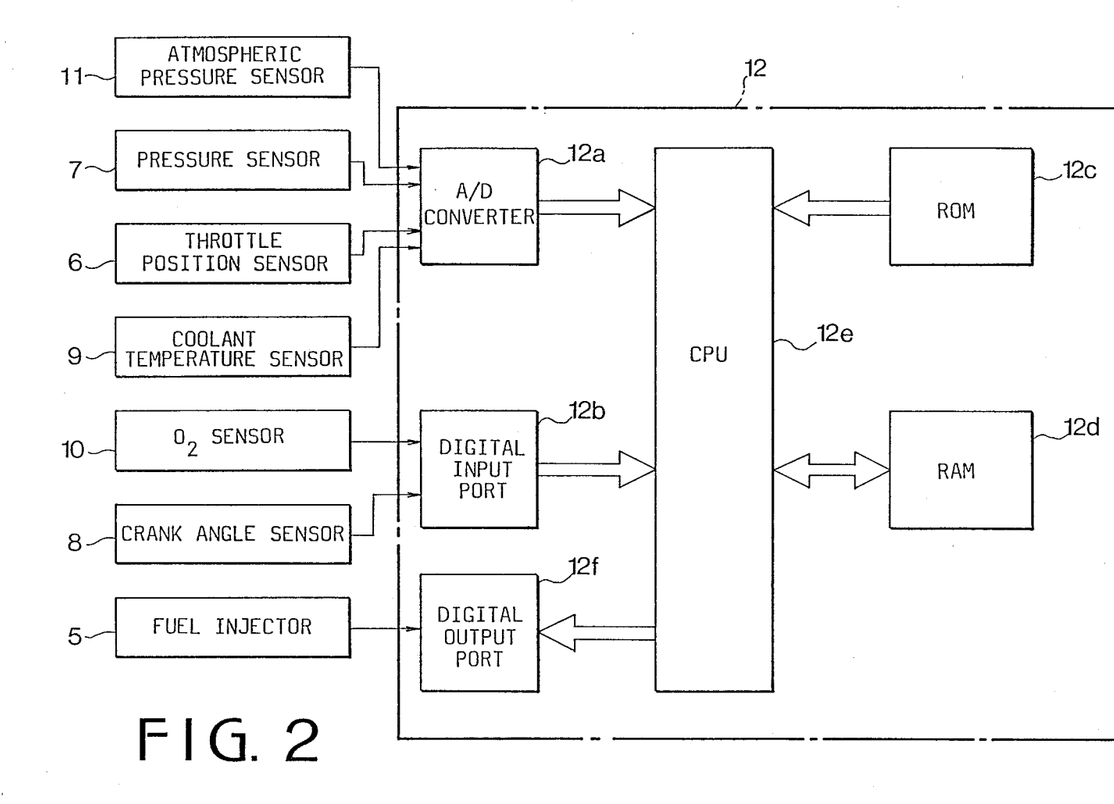
FIG. 2 is a block diagram showing a control unit of the present invention.

Referring to FIG. 2, the control unit 12 comprises an A/D converter 12a supplied with signals from the pressure sensor 7, throttle position sensor 6, coolant temperature sensor 9 and atmospheric pressure sensor 11. A digital input port 12b is supplied with signals from the crank angle sensor 8 and $O_2$-sensor 10. Output signals from the A/D converter 12a and input port 12b are applied to a central processor unit (CPU) 12e. The CPU 12e operates to process these signals in accordance with data and programs stored in a read only memory (ROM) 12c and a random access memory (RAM) 12d and produces a control signal which is applied to a digital output port 12f for driving fuel injectors 5.

Figure 3:
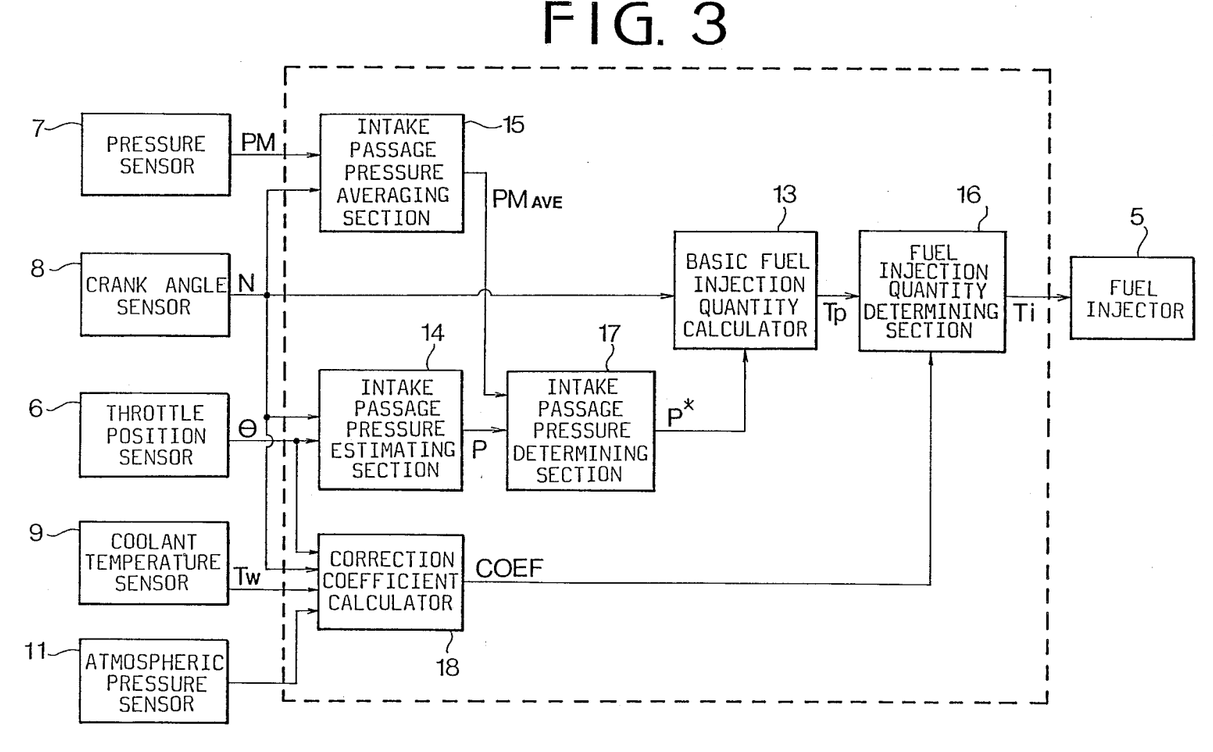
FIG. 3 is a block diagram showing a fuel injection control system of the control unit.

Referring to FIG. 3 showing a fuel injection control system, the engine speed N calculated in the crank angle sensor 8 is applied to a basic fuel injection quantity (pulse width) calculator 13 and an intake passage pressure estimating section 14. A top dead point signal derived from the crank angle signal is applied to an intake passage pressure averaging section 15 to which an intake passage pressure PM from the sensor 7 is applied.

In the intake passage pressure averaging section 15, the intake passage pressure PM is sampled at a short sampling cycle and sampled pressures are averaged at every cycle dependent on the top dead point signal through a weighted mean method for obtaining an average pressure $PM_{AVE}$ by the following equation.

$$PM_{AVE}(t) = a \cdot PM_{AVE}(t-1) + (1-a) PM(t)$$

where a is weight.

Accordingly, influence of oscillation of the absolute pressure in the intake passage can be eliminated.

The intake passage pressure estimating section 14 estimates an estimated pressure P in accordance with the throttle opening degree $\theta$ obtained from the throttle position sensor 6 and the engine speed N with a predetermined model equation. The model equation is obtained from an equivalent circuit shown in FIG. 4b for the intake system shown in FIG. 4a.

Figure 4A:
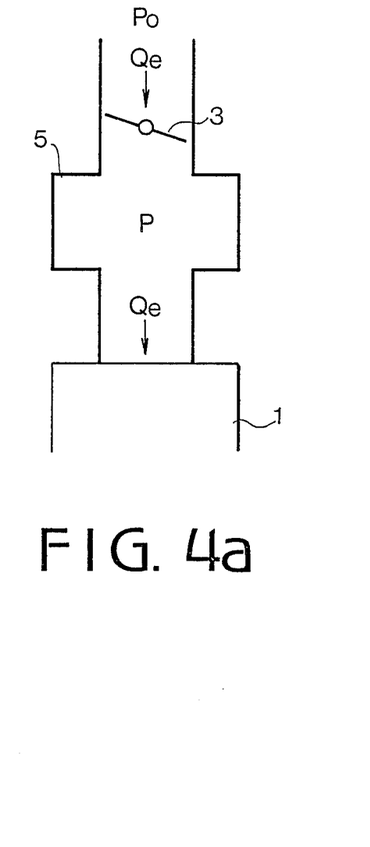
FIGS. 4a and 4b are schematic views of an intake system.
Figure 4B:
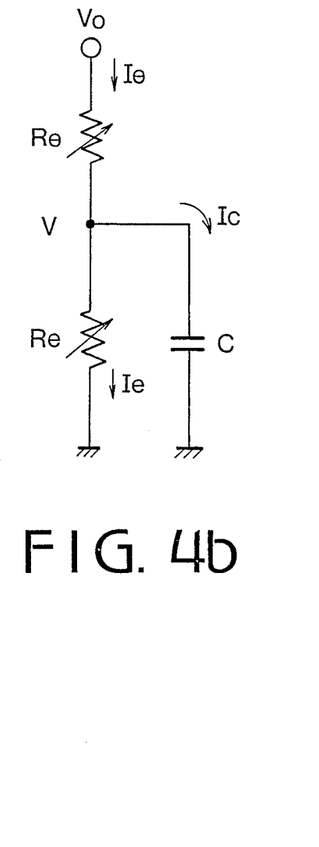

The intake system schematically illustrated in FIG. 4a approximately equals to the electric circuit of FIG. 4b. Namely, Po represents pressure at upstream of the throttle valve 3 and corresponds to the voltage Vo in FIG. 4b. The pressure P in the intake passage 2 at downstream of the throttle valve 3 and chamber 5 corresponds to the voltage V and a quantity $Q\theta$ corresponds to the current $I\theta$ in FIG. 4b. Reference Qe represents the actual quantity of air induced in the cylinder of the engine 1 and corresponds to the current Ie. The current Ic represents a delay of response at the transient state of the engine. A resistance Re and a capacitance C are factors for the delay of response. The model equation is expressed as follows.

$$C \cdot dV/dt = (Vo-V)/R\theta - V/Re$$
$$V = \{Re/(R\theta + Re)\} \times Vo \times (1 - e^{-t/\tau})$$
$$\theta = C \times R\theta \cdot Re/(R\theta + Re)$$

In other word, it will be seen that the intake passage pressure P is estimated in accordance with engine speed N and throttle opening degree $\theta$.

The estimated pressure P from the section 14 is applied to an intake passage pressure determining section 17 to which the average pressure $PM_{AVE}$ is applied. The section 17 calculates a differentiation $\Delta P$ with respect to time representing a changing rate of estimated pressure P, thereby determining the transient state of the engine. At the transient state, the estimated pressure P is used as a set value P* which is applied to the basic fuel injection quantity calculator 13. At a steady state of the engine, the average pressure $PM_{AVE}$ is used as the set value P* which is applied to the section 13. The section 13 calculates a basic fuel injection quantity Tp based on the set value P* and the engine speed N, using data derived from the table in the ROM 12c. The basic injection quantity Tp is applied to a fuel injection quantity determining section 16.

Coolant temperature TW obtained from the sensor 9, atmospheric pressure from the sensor 11, and other signals $\theta$ and N from sensors 6 and 8 are applied to a correction coefficient calculator 18 where a miscellaneous correction coefficient COEF is calculated. The coefficient COEF is applied to the fuel injection quantity determining section 16 in which an injection quantity Ti is calculated through an equation Ti=Tp·COEF. An output signal representing the quantity Ti is applied to the injectors 5 as a fuel injection pulse width.

Figure 5:
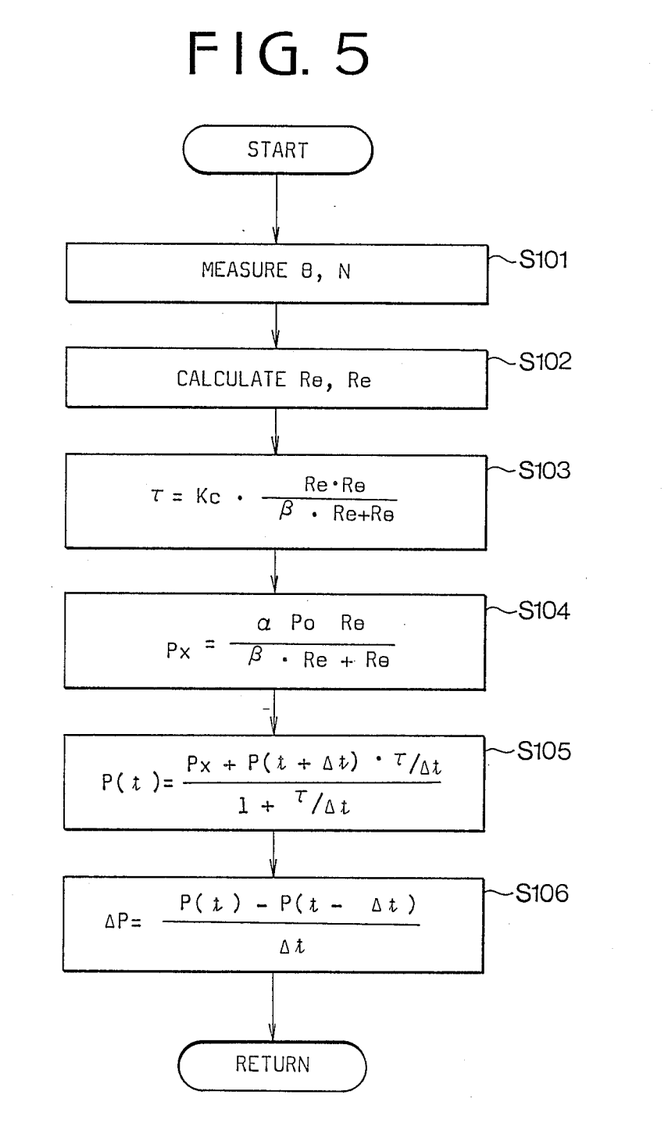
FIG. 5 is a flowchart showing a calculation routine for the fuel injection control.

The calculation for determining the estimated pressure P in the operation of the system is described with reference to the flowchart shown in FIG. 5. At a step S101, the throttle valve opening degree $\theta$ is obtained from the output signal of throttle position sensor 6, and engine speed N is calculated based on the output signal of crank angle sensor 8. At a step S102, the resistances $R\theta$ and Re are derived from lookup tables in accordance with throttle opening degree $\theta$ and the engine speed N. At a step S103, the time constant $\tau$ for the response delay is calculated. At steps S104 to S106, calculations are performed and the estimated pressure P and the differentiation $\Delta P$ are obtained. In the equations described in the flowchart, Kc, $\alpha$, and $\beta$ are constants, respectively.

Figure 6:
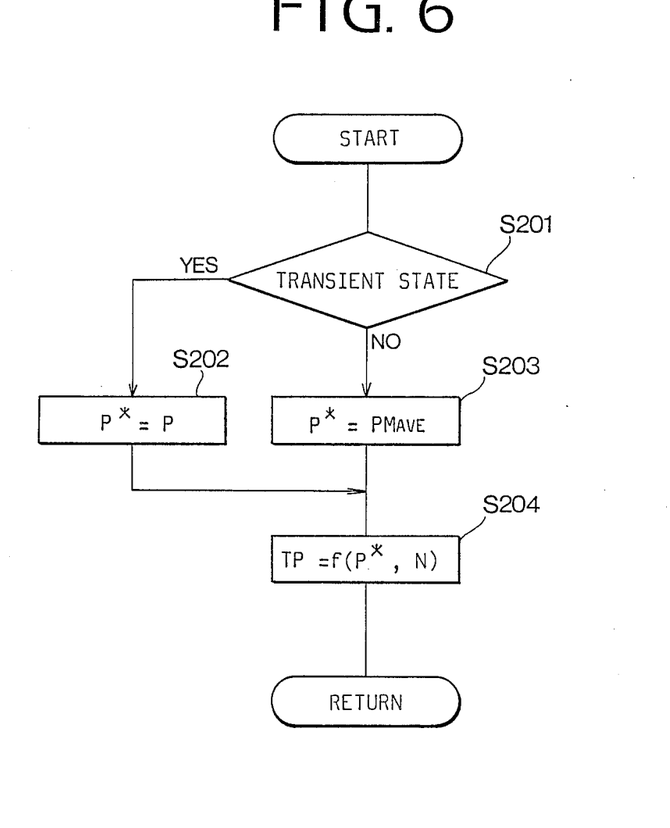
FIG. 6 is a flowchart showing a calculation routine for determining a basic fuel injection quantity.

FIG. 6 shows the flowchart of calculation for determining the basic fuel injection quantity Tp. At a step S201, it is determined whether the differentiation $\Delta P$ exceeds a predetermined pressure value DP or not. When the differentiation $\Delta P$ exceeds the predetermined pressure DP, the transient state of the engine is determined. The program proceeds to a step S202 where the estimated pressure P is set as the set value P* (P*=P). When the steady state of the engine is determined at step S201, the program proceeds to a step S203 where the average pressure $PM_{AVE}$ is set. At a step S204, the basic fuel injection Tp is obtained from the table (Tp = f(P*, N)).

As an alternative method of the system, in the intake passage pressure determining section 17, an absolute difference value between the estimated pressure P and the average pressure $PM_{AVE}$ is calculated and the difference is compared with the predetermined value DP. When the difference exceeds the predetermined value DP, the transient state of the engine is determined.

In accordance with the present invention, since the average pressure or estimated pressure for determining the basic injection quantity is selected in accordance with the steady state and the transient state of the engine, respectively, a proper quantity of fuel is injected without response delay.

While the presently preferred embodiments of the present invention have been shown and described, it is to be understood that this disclosure is for the purpose of illustration and that various changes and modifications may be made without departing from scope of the invention as set forth in the appended claims.

What is claimed is:

1. In a fuel injection control system for an automotive engine having a fuel injector for injecting a predetermined amount of fuel into said engine, a throttle valve mounted in an intake passage of said engine for controlling air-fuel mixture, an engine speed sensor for detecting engine speed and for producing a corresponding engine speed signal, a throttle position sensor for detecting opening degree of said throttle valve and for producing a corresponding throttle position signal, and a pressure sensor for sensing intake air pressure in said intake passage and for generating a corresponding pressure signal, the improvement in the control system which comprises:

averaging means responsive to said engine speed and said pressure signals for averaging said intake air pressure in dependency on said engine speed and for producing a corresponding average signal;

estimating means responsive to said engine speed and throttle position signals for estimating pressure in said intake passage for producing a corresponding estimated pressure signal;

determining means responsive to said average signal and said estimated pressure signal for selecting said estimated pressure signal in a transient state of an operating condition of the engine, and respectively, for selecting said average signal when said operating condition is in a steady state, for producing a set value signal corresponding to each of the transient and steady states; and a calculator responsive to said engine speed signal and said set value signal for calculating a correct value of said predetermined amount for injecting an optimum amount of said fuel from said fuel injector so as to control said engine without any response delay in all ranges of said operating condition of said engine.

2. The fuel injection control system according to claim 1, wherein
said determining means determines said transient state by comparing an absolute difference value between said estimated pressure signal and said average signal with a predetermined value.

3. The fuel injection control system according to claim 2, wherein
said determining means determines said transient state when said absolute difference value exceeds said predetermined value.

4. The fuel injection control system according to claim 1, further comprising
memory means for storing said engine speed and throttle position signals, and
said estimating means calculates aid estimated pressure by deriving a time constant corresponding to said engine speed and throttle position signals stored in said memory means.

5. The fuel injection control system according to claim 1, wherein
said determining means determines said transient state by calculating a differentiation of said estimated pressure signal representing a changing rate of said estimated pressure signal.

6. The fuel injection control system according to claim 1, wherein
said engine speed sensor is a crank angle sensor and said engine speed signal is a crank angle signal,
said averaging means is responsive to a top dead point signal derived from said crank angle signal and said intake air pressure is sampled at a short sampling cycle and averaged on said top dead point signal through a weighted mean.

* * * * *